US007266099B2

(12) United States Patent
Roy et al.

(10) Patent No.: US 7,266,099 B2
(45) Date of Patent: Sep. 4, 2007

(54) METHOD FOR HAND-OFF OF A DATA SESSION

(75) Inventors: Sumit Roy, Menlo Park, CA (US); Bo Shen, Fremont, CA (US); Vijay Sundaram, Amherst, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 976 days.

(21) Appl. No.: 10/056,294

(22) Filed: Jan. 23, 2002

(65) Prior Publication Data

US 2003/0137947 A1    Jul. 24, 2003

(51) Int. Cl.
*H04Q 7/00*    (2006.01)
(52) U.S. Cl. ...................................... 370/331; 370/356
(58) Field of Classification Search ................ 370/331, 370/397, 338, 310.1, 310, 310.2, 328, 349, 370/332, 352–358; 455/412, 439, 436, 437, 455/442, 432.1
See application file for complete search history.

(56) References Cited

U.S. PATENT DOCUMENTS

| | | | | |
|---|---|---|---|---|
| 5,513,183 | A * | 4/1996 | Kay et al. ................... | 370/337 |
| 5,608,779 | A * | 3/1997 | Lev et al. ................... | 455/436 |
| 5,682,416 | A * | 10/1997 | Schmidt et al. ............. | 455/436 |
| 6,061,566 | A * | 5/2000 | Friman ........................ | 455/445 |
| 6,108,549 | A * | 8/2000 | Bonta .......................... | 455/446 |
| 6,128,287 | A * | 10/2000 | Freeburg et al. ............ | 370/331 |
| 6,167,035 | A * | 12/2000 | Veeravalli et al. .......... | 370/331 |
| 6,247,048 | B1 * | 6/2001 | Greer et al. ................. | 709/219 |
| 6,490,259 | B1 * | 12/2002 | Agrawal et al. ............. | 370/331 |
| 6,542,744 | B1 * | 4/2003 | Lin .............................. | 455/437 |
| 6,570,856 | B1 * | 5/2003 | Freeburg et al. .......... | 370/310.1 |
| 2002/0009991 | A1 * | 1/2002 | Lu et al. ....................... | 455/422 |
| 2002/0068570 | A1 * | 6/2002 | Abrol et al. ................. | 455/438 |
| 2004/0071132 | A1 * | 4/2004 | Sundqvist et al. .......... | 370/352 |

FOREIGN PATENT DOCUMENTS

| | | |
|---|---|---|
| GB | 2367978 A | 4/2002 |
| WO | WO01/99291 | 12/2001 |
| WO | WO02/35790 | 5/2002 |

OTHER PUBLICATIONS (Internation Application Pbulished Under the Patent Cooperation Treaty, PCT, WO 95/15665) Bach et al, Communication Across Regional Entities, International Publication Date: Jun. 8, 1995.*
Roger Karrer and Thomas Gross, Dynamic Handoff of Multimedia Streams, Nossdav'01 Jun. 25-26, 2001, pp. 125-133.
Kisup Kim, Hyukjoon Lee & Kwangsue Chung—A Distributed Proxy Server System for Wireless Mobile Web Service—2001 IEEE—pp. 749-754.

* cited by examiner

*Primary Examiner*—Brenda Pham

(57) ABSTRACT

A method for hand-off of a data session in a server. Data is received from a data source. At least a portion of the data is transmitted to an electronic device located in a first location. Notification is received that the electronic device is moving toward a second location. A first message is transmitted to a second server notifying the second server that the electronic device is moving toward the second location, wherein the second server is located proximate to the second location. A second message is received from the second server that the second server is prepared to communicate with the electronic device. The server then stops transmission of the data.

60 Claims, 8 Drawing Sheets

400

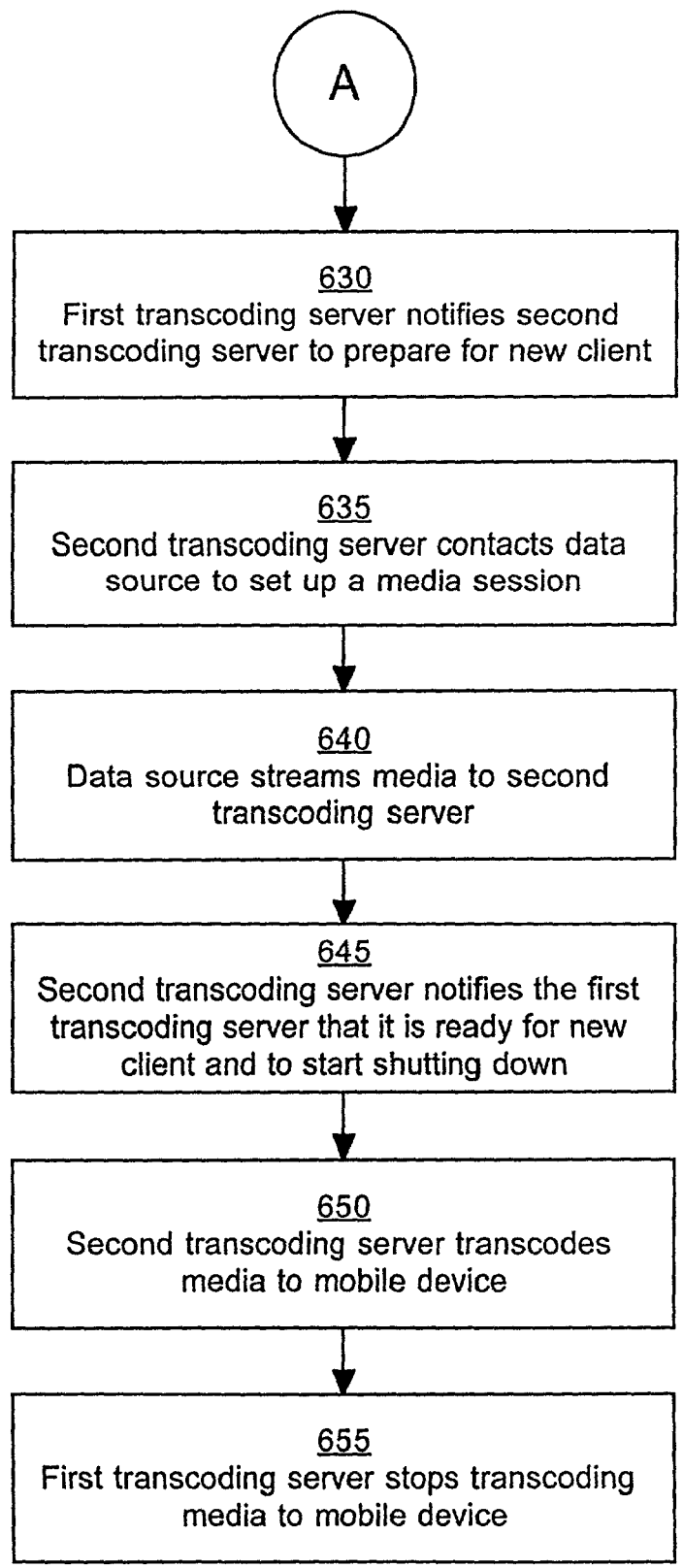

METHOD FOR HAND-OFF OF A DATA SESSION

FIELD OF INVENTION

Various embodiments of the present invention relate to the field of computer networks.

BACKGROUND OF THE INVENTION

As use of computer networks and the Internet continues to expand, the amount of streaming media content continues to grow. For a wired or wireless network, more media rich content is being delivered. In the meantime, an increasing amount of computing resources are being deployed to help the adaptation of the media rich content in order to suit heterogeneous networks and clients.

One method for adapting media rich content to suit a wide array of networks and client devices is transcoding. Transcoding adapts streaming media data for viewing in different formats by adjusting the screen size output and adjusting the bandwidth. Essentially, transcoding adjusts the streaming media according to the characteristics of the viewing device. For example, Digital Video Disc (DVD) quality MPEG-2 data intended for DVD display may be displayed on a small mobile electronic device by reducing the screen size and the bandwidth to account for the viewing characteristics of the electronic device.

Once a transcoding session has begun, it may be desirable to move the session from one server to another. For example, in the event of server failure, another transcoding unit should be able to pick up the transcoding session so that the client session can be continued. Alternatively, due to the overhead required to handle client requests, it may be necessary for one transcoding unit to handoff the tasks it cannot handle to another transcoding that can better serve the client. (e.g., to assist in load balancing). Also, it may be desirable to handoff transcoding sessions to account for the mobility of the receiving electronic device.

Current methods of data session handoff only handle handoff of a communication session at the network level, e.g., a transmission control protocol (TCP) session or real-time transport protocol (RTP) streaming session. A transcoding session uses computing resources to manipulate multimedia streams in order to ease congestion in the network or suit limitations of client devices. The handoff of this kind of transcoding session is different than the handoff of a network connection. Transcoding session handoff is based on the transfer of not only streaming status but also processing status.

If there is no transcoding session handoff capability, one transcoding unit can only handle a limited amount of user requests. Therefore user requests can be denied even if there are other transcoding units available. Also, in a mobile wireless network, if the mobile client has been moved to another location, it is disadvantageous to perform a transcoding session further away from the client while a transcoding unit closer to the client is available.

Moreover, the current data handoff solutions do not provide for seamless handoff of streaming media data sessions in all circumstances. It is desirable that the client is unaware of the handoff, e.g., the handoff should be glitch-free and seamless. In current solutions, the handoff occurs at the network or transport levels, thus adversely affecting the seamlessness of the handoff.

Although portions of the above-listed discussion specifically mention the shortcomings of prior art approaches with respect to the streaming of video data for simplified presentation, such shortcomings are not limited solely to the streaming of video data. Instead, the problems of the prior are span various types of media including, but not limited to, audio-based data, speech-based data, image-based data, graphic data, web page-based data, and the like. Moreover, streaming media typically shares the property that the media streams must be delivered with a relative time constraint and thus share the notion of a stream.

SUMMARY OF THE INVENTION

Embodiments of the present invention provide a method for hand-off of a data session in a server. Data is received from a data source. At least a portion of the data is transmitted to an electronic device located in a first location. Notification is received that the electronic device is moving toward a second location. A first message is transmitted to a second server notifying the second server that the electronic device is moving toward the second location, wherein the second server is located proximate to the second location. A second message is received from the second server that the second server is prepared to communicate with the electronic device. The server then stops transmission of the data.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 6A and 6B are flow charts illustrating a process of data session handoff in accordance with one embodiment of the present claimed invention.

BEST MODE(S) FOR CARRYING OUT THE INVENTION

Figure 1:
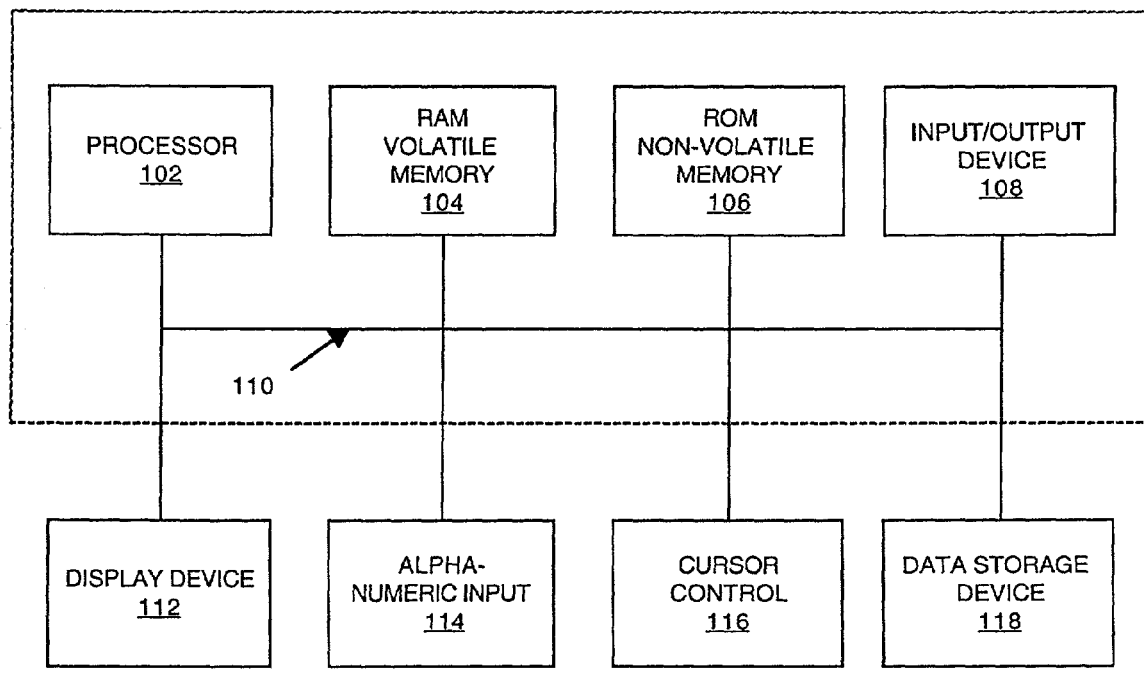
FIG. 1 is a block diagram of one embodiment of an exemplary computer system upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "transmitting" or "receiving" or "notifying" or "contacting" or "transcoding" or "communicating" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Hardware in Accordance with the Present Invention

Portions of the present invention are comprised of computer-readable and computer executable instructions which reside, for example, in computer-usable media of a computer system. FIG. 1 is a block diagram of one embodiment of an exemplary computer system 100 used in accordance with the present invention. It should be appreciated that system 100 is not strictly limited to be a computer system. As such, system 100 of the present embodiment is well suited to be any type of computing device (e.g., server computer, portable computing device, desktop computer, etc.). Within the following discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described in detail below.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable nonvolatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices 108 coupled with bus 110 for enabling system 100 to interface with other electronic devices and computer systems. The communication interface(s) 108 of the present embodiment may include wired and/or wireless communication technology. For example, within the present embodiment, the communication interface 108 is a wireless communication port, but could also alternatively be any of a number of well known communication standards and protocols, e.g., serial communication port, Universal Serial Bus (USB), Ethernet, FireWire (IEEE 1394), parallel, small computer system interface (SCSI), infrared (IR) communication, Bluetooth wireless communication, broadband, and the like.

Optionally, computer system 100 may include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The cursor directing device 116 can be implemented using a number of well known devices such as a mouse, a track-ball, a track-pad, an optical tracking device, a touch screen, etc. Alternatively, it is appreciated that a cursor can be directed and/or activated via input from the alphanumeric input device 114 using special keys and key sequence commands. The present embodiment is also well suited to directing a cursor by other means such as, for example, voice commands. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Method and System for Hand-Off of a Data Session

Figure 2:
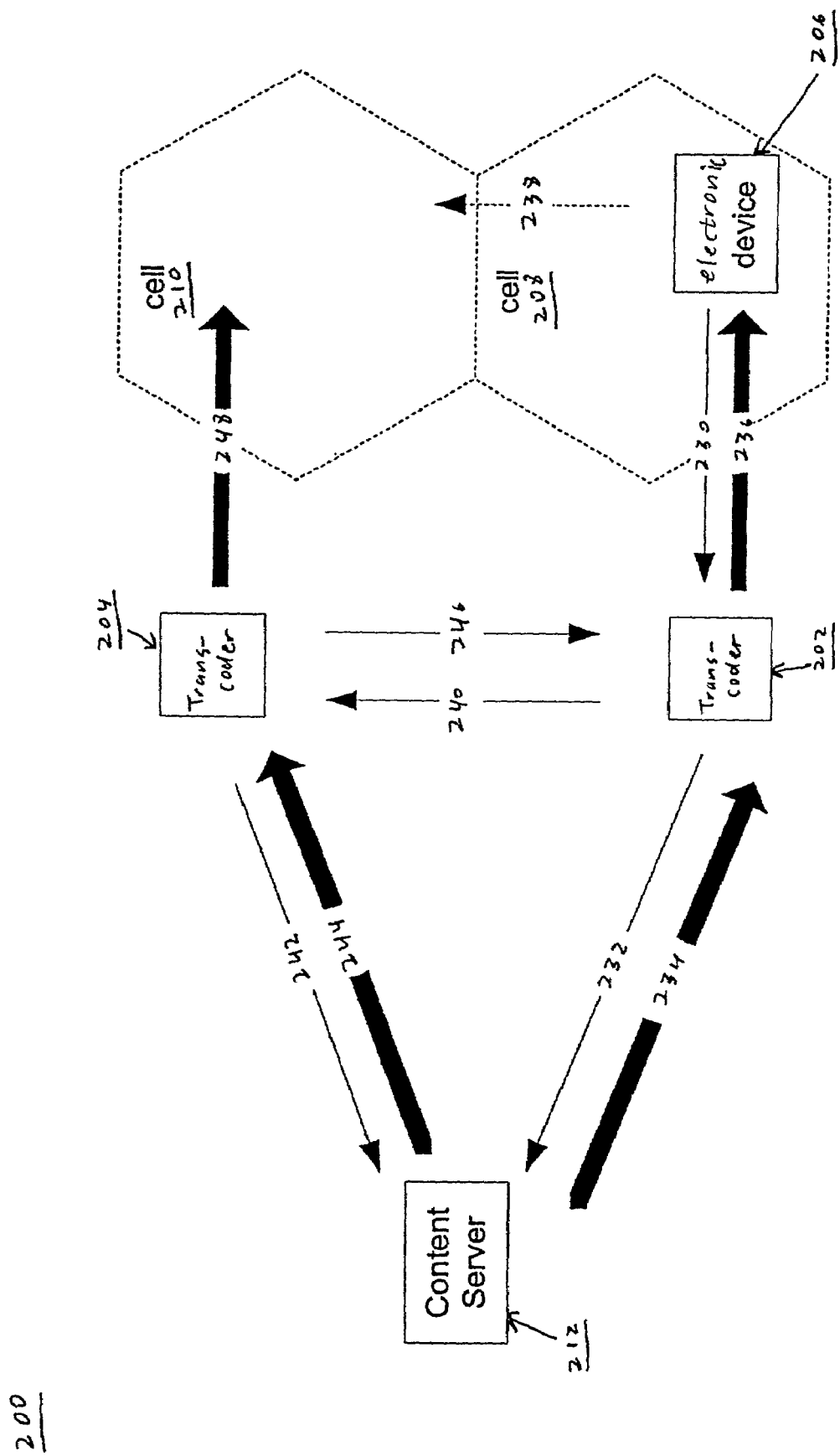
FIG. 2 is a block diagram of a system for data session handoff having a single content server upon which embodiments of the present invention may be practiced.

FIG. 2 is a block diagram of a system 200 for data session handoff having a single content server 212 upon which embodiments of the present claimed invention may be practiced. In one embodiment, in system 200, data (e.g., video media) is streamed to a mobile client (e.g., an electronic device) via a wireless link. In one embodiment, the data is streaming data that is structured and processed in a continuous flow, such as streaming audio and streaming video. Streaming data comprises a plurality of data packets (e.g., portions), wherein each packet is ordered in the flow.

In one embodiment, system 200 comprises a content server 212 (e.g., a data source), transcoders 202 and 204 (e.g., transcoder device 400 of FIG. 4), and electronic device 206. In one embodiment, transcoder 202 is operable to serve media streams to electronic devices located in cell 208, and transcoder 204 is operable to serve media streams to electronic devices located in cell 210. In the present embodiment, content server 212 generates a full-bandwidth, high-resolution video stream that is sent to transcoder 202. Transcoder 202 transcodes the video streams into a lower-bandwidth, medium resolution video stream which is then sent to electronic device 206.

For purposes of the present application, in one embodiment transcoder 202 is referred to as a first transcoder and transcoder 204 is referred to as a second transcoder. In another embodiment, transcoder 202 is referred to as a second transcoder and transcoder 204 is referred to as a first transcoder. For purposes of brevity and clarity, embodiments of the present invention are described herein with reference to transcoder 202 and transcoder 204.

In one embodiment, electronic device 206 is a mobile device. In the present embodiment, electronic device 206 is any device configured to receive data over a wireless connection, including, but not limited to laptop computers, palmtop computer systems, cellular telephones, and the like.

Figure 3:
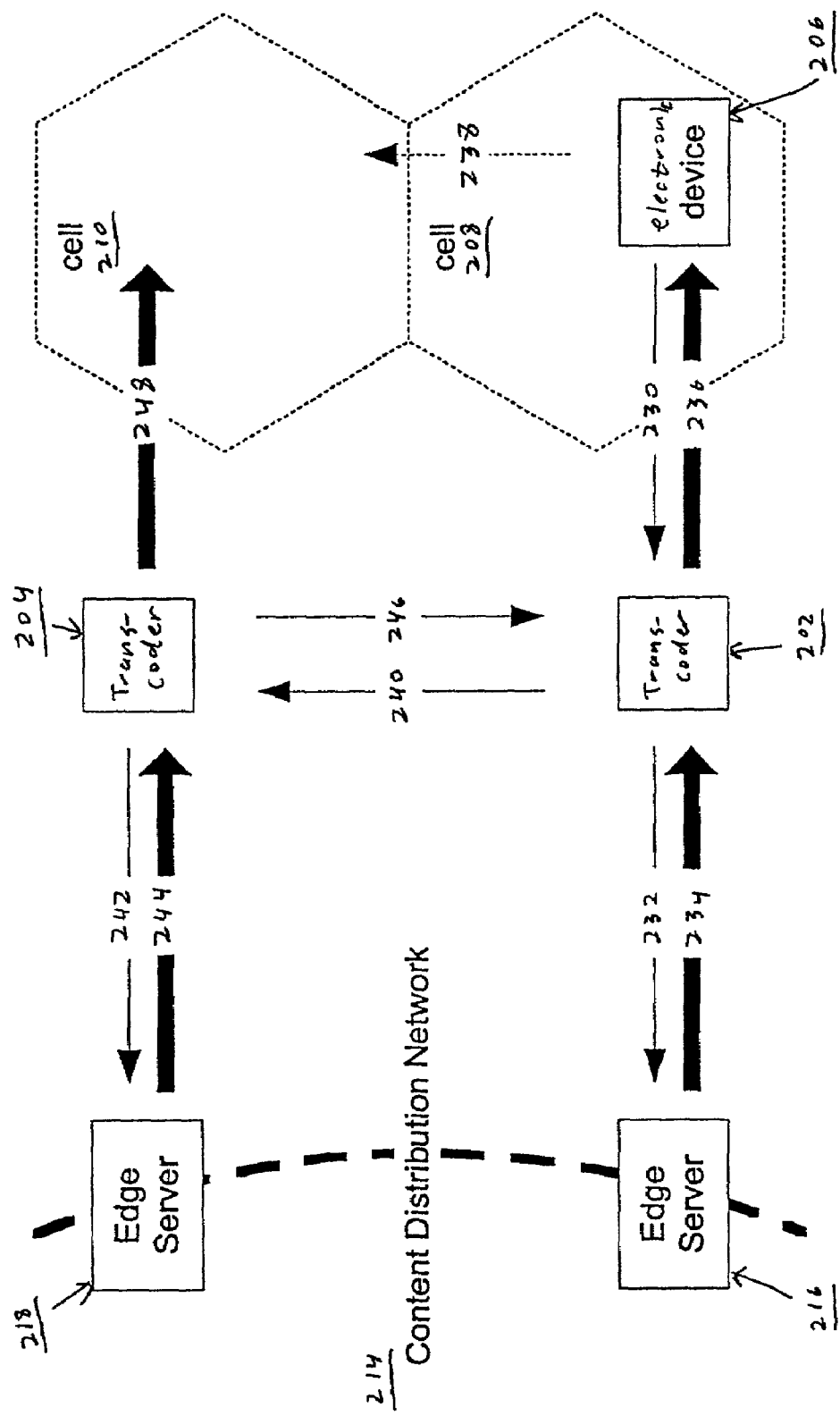
FIG. 3 is a block diagram of a system for data session handoff having a content distribution network upon which embodiments of the present invention may be practiced.

FIG. 3 is a block diagram of a system 300 for data session handoff having a content distribution network 214 upon which embodiments of the present claimed invention may be practiced. In one embodiment, in system 300, data (e.g., video media) is streamed to mobile clients (e.g., mobile electronic devices) via a wireless link. In one embodiment, the data is streaming data that is structured and processed in a continuous flow, such as streaming audio and streaming video.

In one embodiment, system 300 comprises a content distribution network 214 (e.g., a data source), transcoders 202 and 204 (e.g., transcoder device 400 of FIG. 4), and electronic device 206. In one embodiment, transcoder 202 is operable to serve media streams to electronic devices located in cell 208, and transcoder 204 is operable to serve media streams to electronic devices located in cell 210. Content distribution network 214 comprises a plurality of edge servers (e.g., edge servers 216 and 218). Edge servers 216 and 218 are geographically distributed such that they are each intended to serve media to mobile clients geographically proximate to them, cutting down on network overhead. In the present embodiment, edge server 216 generates a full-bandwidth, high-resolution video stream that is sent to transcoder 202. Transcoder 202 transcodes the video streams into a lower-bandwidth, medium resolution video stream which is then sent to electronic device 206.

In one embodiment, electronic device 206 is a mobile device. In the present embodiment, electronic device 206 is any device configured to receive data over a wireless connection, including, but not limited to laptop computers, palmtop computer systems, cellular telephones, and the like.

Referring to FIGS. 2 and 3, both system 200 and system 300 use transcoders 202 and 204 to transcode video streams into lower bandwidth streams that match the display capabilities of the target electronic device (e.g., electronic device 206).

In one implementation, content server 212 or edge server 216 transmits a full-bandwidth media stream to transcoder 202, wherein transcoder 202 transcodes media to electronic devices located in cell 208. It should be appreciated that in one embodiment content server 212 is an edge server. Transcoder 202 then transcodes the media stream into a lower-bandwidth stream and transmits the stream to electronic device 206. Upon transcoder 202 receiving notification that electronic device 206 is moving towards another cell, transcoder 202 initiates a handoff operation with another transcoder serving the new cell. The handoff process is discussed in extensive detail below at process 600 of FIGS. 6A and 6B.

Although portions of the above-listed discussion specifically mention implementations involving streaming of video data for simplified presentation, the present invention also pertains to other types of media including, but not limited to, audio-based data, speech-based data, image-based data, graphic data, web page-based data, and the like. Moreover, although portions of the above-listed discussion specifically mention implementations involving transcoders for simplified presentation, the present invention also pertains to other types of servers including servers that do not perform transcoding functionality.

Figure 4:
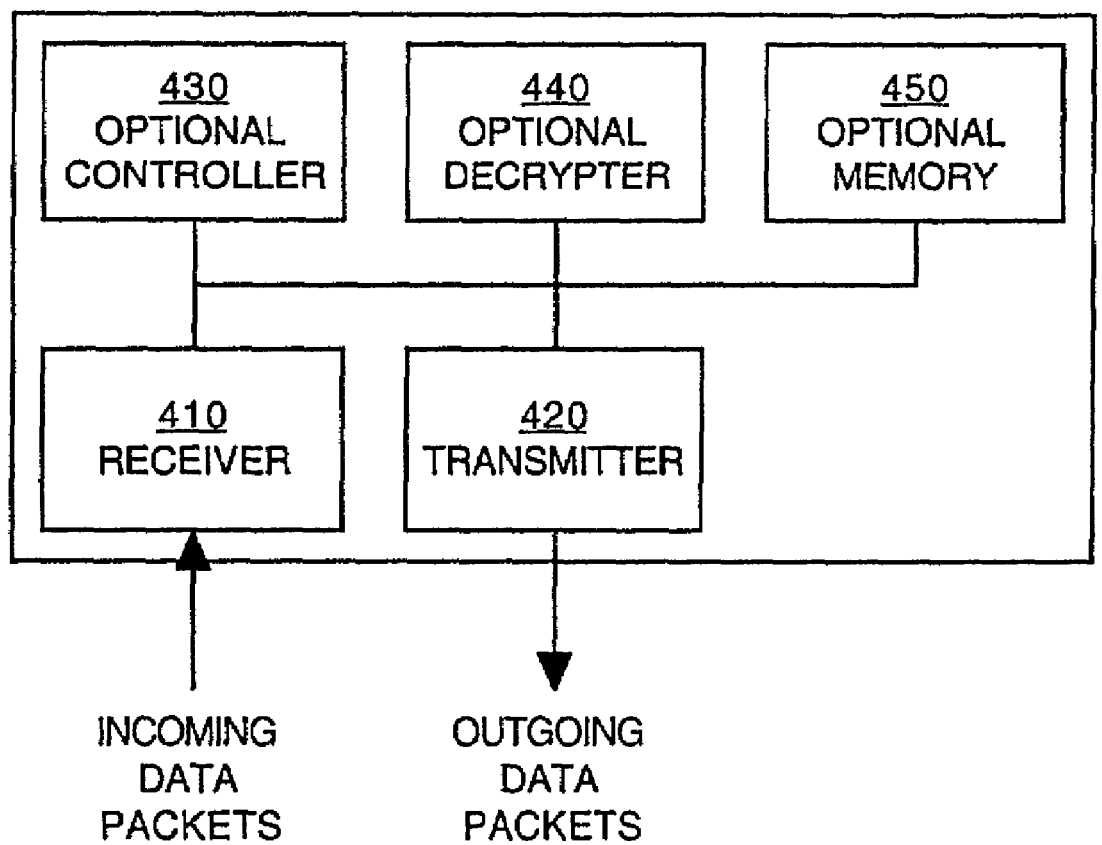
FIG. 4 is a block diagram of one embodiment of a transcoder device upon which embodiments of the present invention may be practiced in accordance with one embodiment of the present claimed invention.

FIG. 4 is a block diagram of one embodiment of transcoder device 400 (e.g., transcoder 202 of FIGS. 2 and 3) upon which embodiments of the present invention may be practiced. In this embodiment, transcoder 400 includes a receiver 410 and a transmitter 420 for receiving a stream of data packets from a source node (e.g., content server 212 of FIG. 2) and for sending a stream of data packets to receiving node (e.g., electronic device 206 of FIG. 2), respectively. Receiver 410 and transmitter 420 are capable of either wired or wireless communication. Separate receivers and transmitters, one for wired communication and one for wireless communication, may also be used. It is appreciated that receiver 410 and transmitter 420 may be integrated as a single device (e.g., a transceiver).

Continuing with reference to FIG. 4, transcoder device 400 may include an optional controller 430 (e.g., a processor or microprocessor), an optional decrypter 440, and an optional memory 450, or a combination thereof. In one embodiment, decrypter 440 is used to decrypt header information. In another embodiment, memory 450 is used to accumulate data packets received from the source node before they are forwarded to the receiving node.

Figure 5:
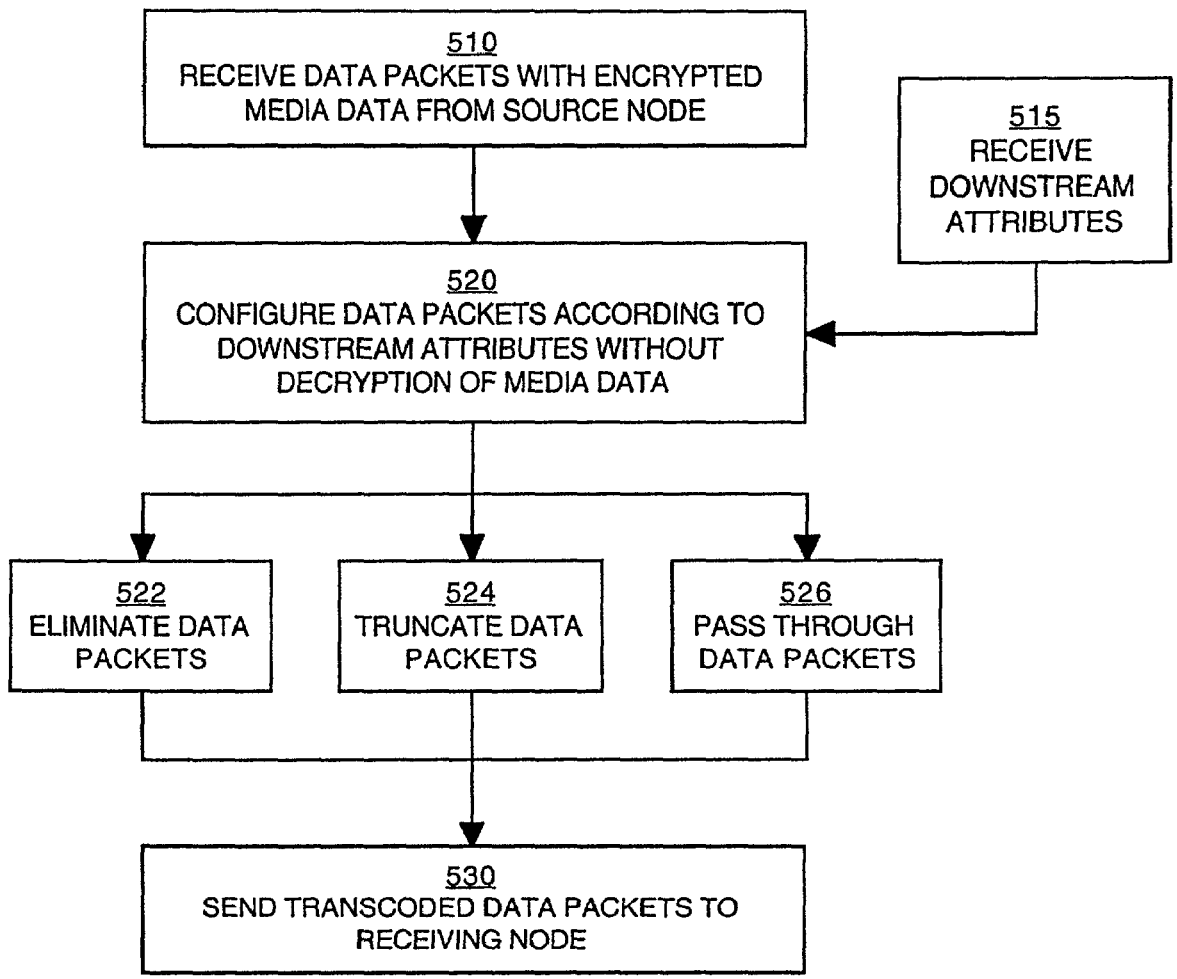
FIG. 5 is a flowchart illustrating a process for transcoding data packets in accordance with one embodiment of the present claimed invention.

FIG. 5 is a flowchart of the steps in a process 500 for transcoding data packets in accordance with one embodiment of the present invention. In one embodiment, process 500 is implemented by transcoder device 400 (FIG. 4) as computer-readable program instructions stored in memory 450 and executed by controller 430. Although specific steps are disclosed in of FIG. 5, such steps are exemplary. That is, the present invention is well suited to performing various other steps or variations of the steps recited in FIG. 5.

In step 510 of FIG. 5, a stream of data packets is received from a source node (e.g., content server 212 of FIG. 2). In the present embodiment, the data packets include encrypted data. In one embodiment, the data are also encoded. In another embodiment, the data packets include a header portion and a payload portion. In one embodiment, the header portion is also encrypted.

In step 515 of FIG. 5, in one embodiment, information describing the attributes of a downstream receiving node or communication channel is received. In another embodiment, the attributes of the receiving node or the communication channel are already known.

In step 520 of FIG. 5, a transcoding function is performed on the stream of data packets to configure the stream according to the attributes of the receiving node. Significantly, the transcoding function is performed without decrypting the data in the data packets. In one embodiment, the transcoding function is performed on information provided by the header portion of each data packet. In one such embodiment, the header information provides recommended truncation points for the payload portion of the respective data packet. In another embodiment, the truncation points are derived from the information provided in the header portion.

In step 522, in one embodiment, the transcoding function eliminates certain data packets from the stream. In step 524, in one embodiment, the transcoding function truncates the data in the data packets. It is appreciated that each data packet may have a different truncation point. In step 526, in one embodiment, the transcoding function passes the data packets through without modification.

In step 530, the transcoded data packets (still encrypted and/or encoded) are sent to the receiving node.

In summary, the above-listed embodiment of the present invention provides a secure method and system for transcoding data for a variety of downstream attributes, such as the attributes of receiving nodes having different capabilities and characteristics or the attributes of the communication between the transcoder and a receiving node. Because the encrypted data do not need to be decrypted and then encrypted again, the computational resources needed for transcoding the stream of data packets is significantly reduced, and the security of the data is not compromised.

Figure 6A:
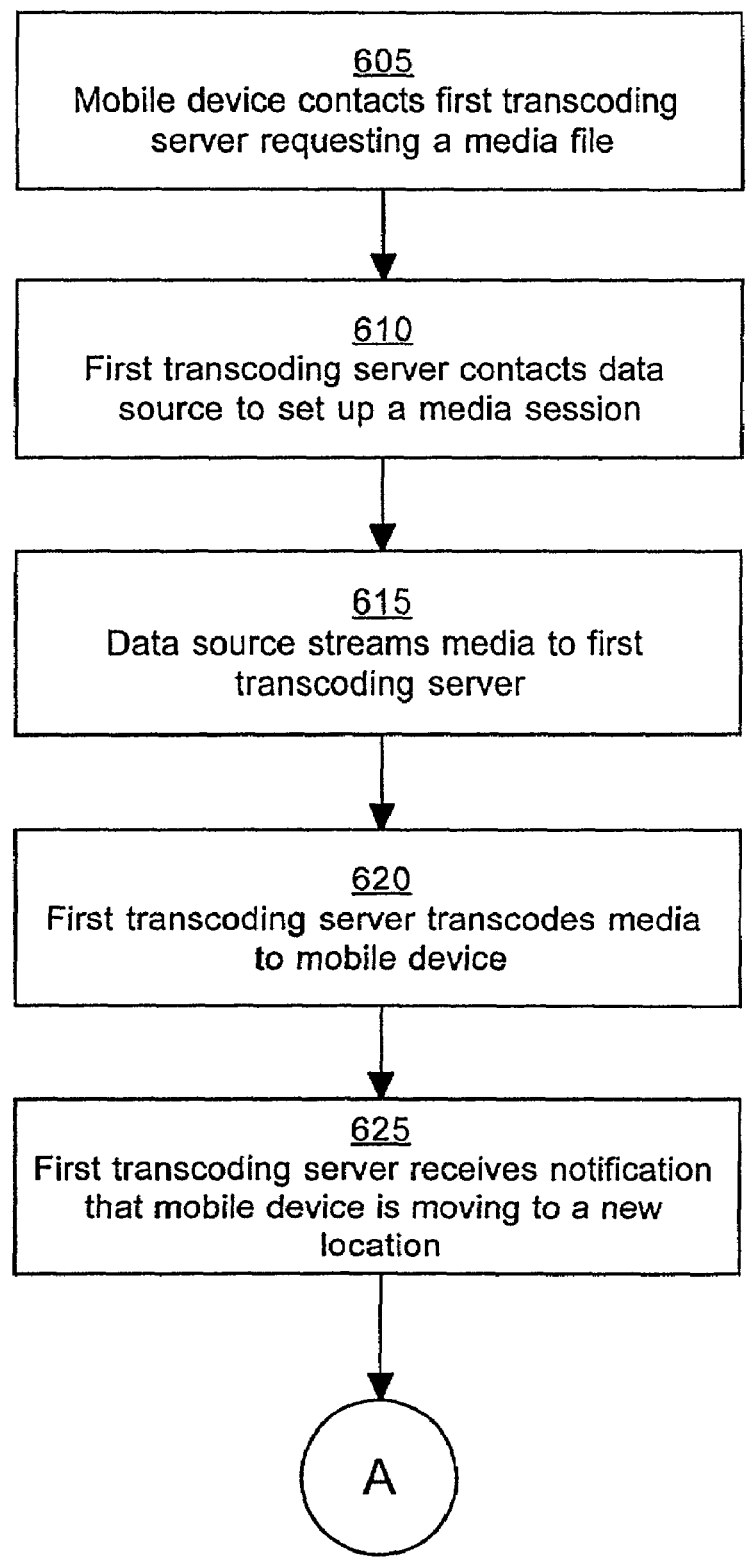

FIGS. 6A and 6B are flow charts illustrating a process 600 of data session handoff in accordance with one embodiment of the present claimed invention. In one embodiment, process 600 is implemented in a transcoder device (e.g., transcoder device 400 of FIG. 4) as computer-readable program instructions stored in memory 450 and executed by controller 430. Although specific steps are disclosed in FIGS. 6A and 6B, such steps are exemplary. That is, the invention is well suited to performing various other steps or variations of the steps recited in FIGS. 6A and 6B.

At step 605 of process 600, a mobile device (e.g., electronic device 206 of FIG. 2) contacts a transcoder (e.g., transcoder 202 of FIG. 2) requesting a media file (e.g., data). In one embodiment, transcoder 202 is operable to serve media to electronic devices located within cell 208. In one embodiment, the mobile device contacts the closest transcoder requesting a media file. In one embodiment, the mobile device contacts the transcoder by sending a message. In one embodiment, the message is a transmission control protocol (TCP) message. Step 605 is graphically represented in FIGS. 2 and 3 as arrow 230.

At step 610, transcoder 202 contacts a data source (e.g., content server 212 or content distribution network 214) to set up a media session. In one embodiment, transcoder 202 contacts the data source (e.g., content server 212 of FIG. 2 or content distribution network 214 of FIG. 3) by sending a message. In one embodiment, the message is a TCP message. Step 610 is graphically represented in FIGS. 2 and 3 as arrow 232.

At step 615, the data source starts streaming the requested media to transcoder 202. In one embodiment, the requested media is transmitted using user datagram protocol (UDP). Step 615 is graphically represented in FIGS. 2 and 3 as arrow 234.

At step 620, transcoder 202 transcodes the streaming media down to electronic device 206. Step 620 is graphically represented in FIGS. 2 and 3 as arrow 236.

At step 625, transcoder 202 is informed that electronic device 206 is moving to a new location (e.g., cell 210). In one embodiment, electronic device 206 communicates the move to a new location directly to transcoder 202 by. In another embodiment, notification of the move is communicated to transcoder 202 by a camera located proximate electronic device 206 and monitoring electronic device 206 for movement. In another embodiment, electronic device 206 moving to a new location is predicted by a computer system based on monitored behavior of electronic device 206. In another embodiment, electronic device 206 moving to a new location is determined based on a global positioning system resident within electronic device 206 that is monitored by transcoder 202. It should be appreciated that transcoder 202 can be made aware of the movement of electronic device 206 to a new location by any method. The movement of electronic device 206 from cell 208 to cell 210 is graphically represented in FIGS. 2 and 3 as arrow 238.

At step 630 transcoder 202 sends a handoff message to a transcoder (e.g., transcoder 204) proximate to cell 210, notifying transcoder 204 to prepare to stream the media to electronic device 206. In one embodiment, the handoff message comprises transcoding information (e.g., display size and bandwidth size of electronic device 206) and a sequence header (e.g., the current byte location of the data stream). The sequence header indicates which portion of the media stream is currently being transmitted to electronic device 206. In one embodiment, transcoder 202 notifies transcoder 204 by sending a message. In one embodiment, the message is a TCP message. Step 630 is graphically represented in FIGS. 2 and 3 as arrow 240.

At step 635, transcoder 204 contacts the data source to set up a media session. In one embodiment, the media session is requested based on the sequence header received at step 630. By beginning the media session at the bit location indicated in the sequence header, electronic device 206 receives a seamless media session even while switching transcoders. In one embodiment, transcoder 204 notifies the data source by sending a message. In one embodiment, the message is a TOP message. Step 635 is graphically represented in FIGS. 2 and 3 as arrow 242.

At step 640, the data source starts streaming the requested media to transcoder 204. In one embodiment, as recited above, the media session is transcoded to electronic device 206 beginning at the bit location indicated in the sequence header, providing electronic device 206 with a seamless media session. In one embodiment, the requested media is transmitted using UDP. Step 640 is graphically represented in FIGS. 2 and 3 as arrow 244.

At step 645, transcoder 204 notifies transcoder 202 that it is ready to communicate with electronic device 206 and that transcoder 202 can shut off communication with electronic device 206. In one embodiment, transcoder 204 notifies transcoder 202 by sending a message. In one embodiment, the message is a TCP message. Step 645 is graphically represented in FIGS. 2 and 3 as arrow 246.

At step 650, transcoder 204 transcodes the streaming media down to electronic device 206. As described above, the streaming media is presented to electronic device 206 in a seamless fashion, beginning the transcoding at the location indicated in the sequence header received at step 630. Step 650 is graphically represented in FIGS. 2 and 3 as arrow 248.

At step 655, transcoder 202 stops transcoding media to electronic device 206.

Figure 7:
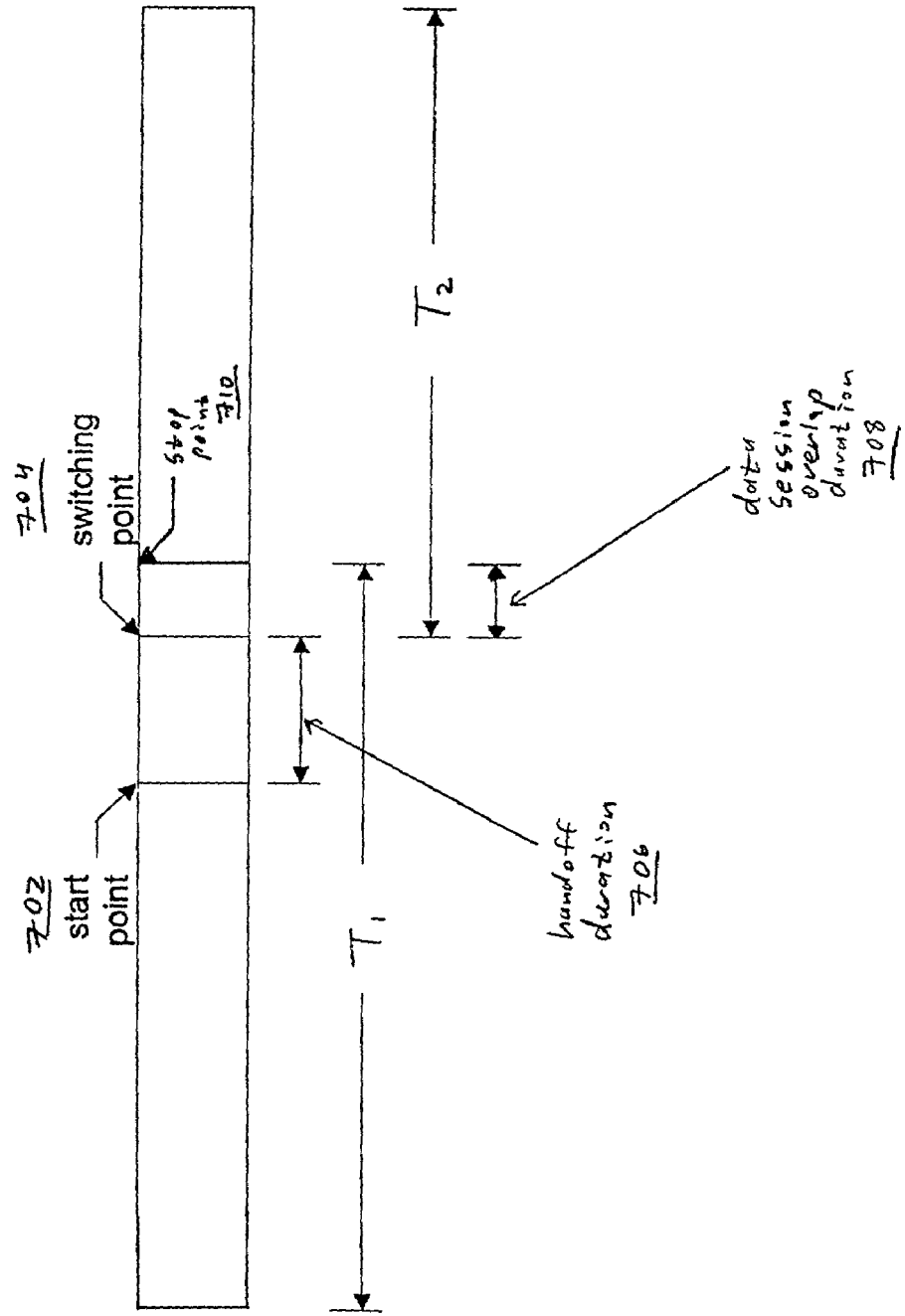
FIG. 7 illustrates a time sequence of a method of data session handoff in accordance with one embodiment of the present invention.

FIG. 7 illustrates a time sequence 700 of details of a process 600 (FIG. 6)of data session handoff in accordance with one embodiment of the present invention. For illustration of one embodiment of a handoff sequence, $T_1$ indicates the time period for which transcoder 202 (FIGS. 2 and 3) is transcoding data to electronic device 206 (FIGS. 2 and 3) and $T_2$ indicates the time period for which transcoder 204 (FIGS. 2 and 3) is transcoding data to electronic device 206.

At start point 702, transcoder 202 establishes a connection with transcoder 204. To initiate the data session handoff, transcoder 202 transmits handoff data to transcoder 204. The handoff data enables transcoder 204 to pickup and continue the transcoding session. In one embodiment, the handoff data comprises transcoding information (e.g., display size and bandwidth size of electronic device 206) and a sequence header (e.g., the current byte location of the data stream). Start point 702 is represented in FIG. 6 at step 630.

In one embodiment, start point 702 begins at a packet boundary of the media stream. In another embodiment, start point 702 begins at a frame boundary of the media stream. In another embodiment, start point 702 begins at a group of pictures (GOP) boundary of the media stream.

Handoff duration 706 is the time period between start point 702 and switching point 704. During handoff duration 706, transcoder 204 contacts the data source to set up a media session, and the data source starts streaming the requested media to transcoder 204. Also during handoff duration 706, transcoder 202 continues to transcode the media session to electronic device 206. Handoff duration 706 is represented in FIG. 6 at steps 635 and 640.

In one embodiment, handoff duration 706 is measured by the amount of data transmitted between start point 702 and switching point 704. In another embodiment, handoff duration 706 is measured by elapsed time between start point 702 and switching point 704. In one embodiment, handoff duration 706 is based on the round trip time between transcoder 202 and transcoder 204, between transcoder 204 and the data source, and the required initialization time of transcoder 204.

At switching point 704, transcoder 204 notifies transcoder 202 that it is prepared to start a media session with electronic device 206 and starts a media session with electronic device 206. Switching point 704 is represented in FIG. 6 at steps 645 and 650.

After switching point 704, transcoder 202 continues transcoding data to electronic device 206 for data session overlap period 708. This is to account for possible delays of electronic device 206 receiving the media session from transcoder 204, thus ensuring a seamless handoff.

Data session overlap period 708 indicates the period that both between transcoder 202 and transcoder 204 are conducting the session, therefore the client receives packets from both between transcoder 202 and transcoder 204. In one embodiment, data session overlap period 708 is zero.

At stop point 710, transcoder 202 stops transcoding media to electronic device 206. Stop point 710 is represented in FIG. 6 at step 655.

The preferred embodiment of the present invention, a method for hand-off of a data session, is thus described. While the present invention has been described in particular embodiments, it should be appreciated that the present invention should not be construed as limited by such embodiments, but rather construed according to the below claims.

What is claimed is:

1. In a first server, a method of data session handoff, said method comprising:
 receiving data from a data source;
 transcoding said data according to at least one characteristic of an electronic device;
 transmitting at least a portion of said data to said electronic device located in a first location;
 receiving notification that said electronic device is moving toward a second location served by a second server;
 transmitting a first message to said second server notifying said second server that said electronic device is moving toward said second location;
 receiving a second message from said second server that said second server is prepared to communicate with said electronic device, said second server transmitting a third message to said data source notifying said data source to transmit at least a portion of said data to said second server, and said data source transmitting at least a portion of said data to said second server; and
 said first server stopping transmission of said data.

2. The method as recited in claim 1 wherein said first server and said second server are transcoder devices.

3. The method as recited in claim 1 wherein said data source is a content server.

4. The method as recited in claim 1 wherein said data source is a content distribution network comprised of a plurality of edge servers.

5. The method as recited in claim 1 wherein said data is streaming media data.

6. The method as recited in claim 1 wherein said electronic device is communicatively coupled to said server by a wireless connection.

7. The method as recited in claim 1 further comprising, prior to said first server stopping transmission of said data, said second server transmitting at least a portion of said data to said electronic device.

8. The method as recited in claim 1 wherein said data is user datagram protocol data.

9. The method as recited in claim 1 wherein said first message and said second message are transmission control protocol messages.

10. A server comprising:
 a bus;
 a computer-readable memory coupled to said bus; and
 a processor coupled to said bus, said processor for executing a method of data session handoff, said method comprising:
  receiving data from a data source;
  transcoding said data according to at least one characteristic of an electronic device;
  transmitting at least a portion of said data to said electronic device located in a first location;
  receiving notification that said electronic device is moving toward a second location served by a second server;
  transmitting a first message to said second server notifying said second server that said electronic device is moving toward said second location;
  receiving a second message from said second server that said second server is prepared to communicate with said electronic device, said second server transmitting a third message to said data source notifying said data source to transmit at least a portion of said data to said second server, and said data source transmitting at least a portion of said data to said second server; and
  said server stopping transmission of said data.

11. The server as recited in claim 10 wherein said first server and said second server are transcoder devices.

12. The server as recited in claim 10 wherein said data source is a content server.

13. The server as recited in claim 10 wherein said data source is a content distribution network comprised of a plurality of edge servers.

14. The server as recited in claim 10 wherein said data is streaming media data.

15. The server as recited in claim 10 wherein said electronic device is communicatively coupled to said server by a wireless connection.

16. The server as recited in claim 10 wherein said method further comprises, prior to said server stopping transmission of said data, said second server transmitting at least a portion of said data to said electronic device.

17. The server as recited in claim 10 wherein said data is user datagram protocol data.

18. The server as recited in claim 10 wherein said first message and said second message are transmission control protocol messages.

19. A computer-readable medium having computer-readable program code embodied therein which when executed by a computer system causes the computer system to perform a method of data session handoff, wherein said computer system comprises a server, said method comprising:
receiving data from a data source;
transcoding said data according to at least one characteristic of an electronic device;
transmitting at least a portion of said data to said electronic device located in a first location;
receiving notification that said electronic device is moving toward a second location served by a second server;
transmitting a first message to said second server notifying said second server that said electronic device is moving toward said second location;
receiving a second message from said second server that said second server is prepared to communicate with said electronic device, said second server transmitting a third message to said data source notifying said data source to transmit at least a portion of said data to said second server, and said data source transmitting at least a portion of said data to said second server; and
said server stopping transmission of said data.

20. The computer-readable medium as recited in claim 19 wherein said server and said second server are transcoder devices.

21. The computer-readable medium as recited in claim 19 wherein said data source is a content server.

22. The computer-readable medium as recited in claim 19 wherein said data source is a content distribution network comprised of a plurality of edge servers.

23. The computer-readable medium as recited in claim 19 wherein said data is streaming media data.

24. The computer-readable medium as recited in claim 19 wherein said electronic device is communicatively coupled to said server by a wireless connection.

25. The computer-readable medium as recited in claim 19 further comprising, prior to said server stopping transmission of said data, said second server transmitting at least a portion of said data to said electronic device.

26. The computer-readable medium as recited in claim 19 wherein said data is user datagram protocol data.

27. The computer-readable medium as recited in claim 19 wherein said first message and said second message are transmission control protocol messages.

28. In a first server, a method of data session handoff, said method comprising:
said first server receiving a first message from a second server, said first message notifying said first server that an electronic device is moving toward a location, said second server receiving at least a portion of data from a data source, said second server transmitting at least a portion of said data to said electronic device, said second server receiving notification that said electronic device is moving toward said location, said second server transmitting said first message to said server;
said first server transmitting a second message to said data source, said second message notifying said data source to transmit at least a portion of said data to said first server;
said first server receiving at least a portion of said data from said data source;
said first server transcoding at least a portion of said data according to at least one characteristic of said electronic device;
said first server transmitting a third message to said second server that said server is prepared to communicate with said electronic device; and
said first server transmitting at least a portion of said data to said electronic device.

29. The method as recited in claim 28 wherein said first server and said second server are transcoder devices.

30. The method as recited in claim 28 wherein said data source is a content server.

31. The method as recited in claim 28 wherein said data source is a content distribution network comprised of a plurality of edge servers.

32. The method as recited in claim 28 wherein said data is streaming media data.

33. The method as recited in claim 28 wherein said electronic device is communicatively coupled to said server by a wireless connection.

34. The method as recited in claim 28 further comprising, prior to said transmitting at least a portion of said data:
said second server receiving said third message from said first server; and
said second server stopping transmission of said data to said electronic device.

35. The method as recited in claim 28 wherein said data is user datagram protocol data.

36. The method as recited in claim 28 wherein said first message and said second message are transmission control protocol messages.

37. A server comprising:
a bus;
a computer-readable memory coupled to said bus; and
a processor coupled to said bus, said processor for executing a method of data session handoff, said method comprising:
receiving a first message from a second server notifying said server that an electronic device is moving toward a location served by said server, said second server receiving at least a portion of data from a data source, said second server transmitting at least a portion of said data to said electronic device, said second server receiving notification that said electronic device is moving toward said location, and said second server transmitting said first message to said server;
transmitting a second message to a data source for transmitting data, said second message notifying said data source to transmit at least a portion of said data to said server;
receiving at least a portion of said data from said data source;
transcoding at least a portion of said data according to at least one characteristic of said electronic device;
transmitting a third message to said second server that said server is prepared to communicate with said electronic device; and transmitting at least a portion of said data to said electronic device.

38. The server as recited in claim 37 wherein said server and said second server are transcoder devices.

39. The server as recited in claim 37 wherein said data source is a content server.

40. The server as recited in claim 37 wherein said data source is a content distribution network comprised of a plurality of edge servers.

41. The server as recited in claim 37 wherein said data is streaming media data.

42. The server as recited in claim 37 wherein said electronic device is communicatively coupled to said server by a wireless connection.

43. The server as recited in claim 37 wherein said method further comprises, prior to said transmitting at least a portion of said data:

said second server receiving said third message from said server; and said second server stopping transmission of said data to said electronic device.

44. The server as recited in claim 37 wherein said data is user datagram protocol data.

45. The server as recited in claim 37 wherein said first message and said second message are transmission control protocol messages.

46. A computer-readable medium having computer-readable program code embodied therein which when executed by a computer system causes the computer system to perform a method of data session handoff, wherein said computer system comprises a server, said method comprising:

receiving a first message from a second server notifying said server that an electronic device is moving toward a location served by said server, said second server receiving at least a portion of data from a data source, said second server transmitting at least a portion of said data to said electronic device, said second server receiving notification that said electronic device is moving toward said location, and said second server transmitting said first message to said server;

transmitting a second message to a data source for transmitting data, said second message notifying said data source to transmit at least a portion of said data to said server;

receiving at least a portion of said data from said data source;

transcoding at least a portion of said data according to at least one characteristic of said electronic device;

transmitting a third message to said second server that said server is prepared to communicate with said electronic device; and transmitting at least a portion of said data to said electronic device.

47. The computer-readable medium as recited in claim 46 wherein said server and said second server are transcoder devices.

48. The computer-readable medium as recited in claim 46 wherein said data source is a content server.

49. The computer-readable medium as recited in claim 46 wherein said data source is a content distribution network comprised of a plurality of edge servers.

50. The computer-readable medium as recited in claim 46 wherein said data is streaming media data.

51. The computer-readable medium as recited in claim 46 wherein said electronic device is communicatively coupled to said server by a wireless connection.

52. The computer-readable medium as recited in claim 46 further comprising, prior to said transmitting at least a portion of said data:

said second server receiving said third message from said server; and said second server stopping transmission of said data to said electronic device.

53. The computer-readable medium as recited in claim 46 wherein said data is user datagram protocol data.

54. The computer-readable medium as recited in claim 46 wherein said first message and said second message are transmission control protocol messages.

55. A system of hand-off of a data session comprising:

a first server for transcoding at least a portion of data received from a data source according to at least one characteristic of an electronic device and configured to transmit at least a portion of said data to said electronic device located in a first location; and a second server for transcoding at least a portion of said data received from said data source according to at least one characteristic of said electronic device and configured to transmit at least a portion of said data to said electronic device when said electronic device is located in a second location;

wherein said first server notifies said second server when said electronic device is moving toward said second location, wherein said second server transmits a message notifying said data source to transmit at least a portion of said data to said second server and wherein said data source transmits at least a portion of said data to said second server.

56. The system as recited in claim 55 wherein said first server and said second server are transcoder devices.

57. The system as recited in claim 55 wherein said data source is a content server.

58. The system as recited in claim 55 wherein said data source is a content distribution network comprised of a plurality of edge servers.

59. The system as recited in claim 55 wherein said plurality of data portions is streaming media data.

60. The system as recited in claim 55 wherein said electronic device is communicatively coupled to said first server and said second server by a wireless connection.

* * * * *

UNITED STATES PATENT AND TRADEMARK OFFICE
CERTIFICATE OF CORRECTION

PATENT NO. : 7,266,099 B2 Page 1 of 1
APPLICATION NO. : 10/056294
DATED : September 4, 2007
INVENTOR(S) : Sumit Roy et al.

It is certified that error appears in the above-identified patent and that said Letters Patent is hereby corrected as shown below:

In column 8, line 37, delete "TOP" and insert -- TCP --, therefor.

Signed and Sealed this

Twenty-fourth Day of November, 2009

David J. Kappos
*Director of the United States Patent and Trademark Office*